(12) United States Patent
Jee et al.

(10) Patent No.: US 7,364,511 B2
(45) Date of Patent: *Apr. 29, 2008

(54) TORSIONAL VIBRATION DAMPER

(75) Inventors: Tae Han Jee, Suwon (KR); Young Rae Song, Seoul (KR); Jae Hoon Jung, Seongnam (KR)

(73) Assignee: Hyundai Motor Company, Seoul (KR)

( * ) Notice: Subject to any disclaimer, the term of this patent is extended or adjusted under 35 U.S.C. 154(b) by 231 days.

This patent is subject to a terminal disclaimer.

(21) Appl. No.: 11/200,780

(22) Filed: Aug. 9, 2005

(65) Prior Publication Data

US 2006/0053961 A1   Mar. 16, 2006

(30) Foreign Application Priority Data

Aug. 11, 2004   (KR) .................... 10-2004-0063308

(51) Int. Cl.
*F16F 15/129* (2006.01)
(52) U.S. Cl. ......................................... 464/7; 464/68.4
(58) Field of Classification Search ............. 464/7, 464/68.4, 68.41, 68.92; 192/113.36; 74/574.4
See application file for complete search history.

(56) References Cited

U.S. PATENT DOCUMENTS 5,092,820 A * 3/1992 Naudin et al. ........... 464/68.92
5,307,710 A   5/1994 Feldhaus et al.
6,408,999 B2 * 6/2002 Otto et al. .......... 192/113.36 X
7,140,966 B2 * 11/2006 Jee ............................ 464/68.4

FOREIGN PATENT DOCUMENTS

| DE | 19730000 A1 | 1/1999 |
| DE | 19958813 | 12/2000 |
| EP | 0478106 A3 | 4/1992 |
| EP | 1460304 A1 | 9/2004 |
| JP | 08-270679 | 10/1996 |
| KR | 1020040037781 A | 5/2004 |

* cited by examiner

Primary Examiner—Greg Binda
(74) Attorney, Agent, or Firm—Morgan Lewis & Bockius LLP

(57) ABSTRACT

A torsional vibration damper includes: a primary mass adapted to be coupled to an engine crankshaft and defining a substantially ring-shaped chamber that is divided into at least two portions; a secondary mass relatively rotatably connected to the primary mass and connectable with a clutch; and a damping unit for coupling the primary and secondary masses to each other in a rotationally elastic manner. The damping unit includes a plurality of coil springs, a pair of end guides, and a friction guide that is disposed between neighboring coil springs and provided with an outer circumferential surface configured to be rubbed against an outer wall of the ring-shaped chamber. An oil groove is formed on the outer circumferential surface of the friction guide and at least a portion of the oil groove is formed to be slanted with respect to a circumferential direction of the ring-shaped chamber.

7 Claims, 11 Drawing Sheets

TORSIONAL VIBRATION DAMPER

CROSS REFERENCE TO RELATED APPLICATION

The present application claims priority to Korean Application No. 10-2004-0063308, filed on Aug. 11, 2004, and the disclosure of which is incorporated herein by reference in its entirety.

FIELD OF THE INVENTION

Generally, the present invention relates to a torsional vibration damper for a vehicle.

BACKGROUND OF THE INVENTION

A torsional vibration damper, i.e., a dual mass flywheel, is generally used for dampening a torsional vibration that is generated from the transmission of power between an output shaft of an engine and an input shaft of a transmission. Typically, torsional vibration dampers include a first mass, a second mass, and a damping unit disposed between the first and second masses. The first mass is connected to the output shaft of the engine, and the second mass is connected to the input shaft of the transmission through a clutch mechanism.

Generally, a ring-shaped chamber is formed in the first mass, and the damping unit is disposed within the ring-shaped chamber. In particular, the damping unit is disposed within the ring-shaped chamber such that it can be compressed by the first and second masses in response to a relative rotation between the first and second masses.

The damping unit includes a plurality of coil springs that are situated in series and disposed one after the other within the ring-shaped chamber, and at least one friction member that is slidably disposed between neighboring coil springs and configured to be rubbed against an inner surface of the ring-shaped chamber.

The ring-shaped chamber is filled with lubrication oil for lubricating the inner surface of the ring-shaped chamber.

The conventional torsional vibration damper has a problem in that lubrication between a frictional surface of the friction member and an inner surface of the ring-shaped chamber cannot be effectively achieved. Moreover, the lubrication oil cannot be uniformly distributed on both sides of the friction member. The friction member also may become damaged when it rubs against the coil spring. Because of such problems, the conventional torsional vibration damper does not have good durability.

The information disclosed in this section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a torsional vibration damper having non-limiting advantages of achieving effective lubrication while minimizing damage to a friction member by a coil spring.

According to an embodiment of the present invention, an exemplary torsional vibration damper includes: a primary mass adapted to be coupled to an engine crankshaft for rotation about a rotational axis of the engine crankshaft, the primary mass defining a substantially ring-shaped chamber that is divided into at least two portions; a secondary mass relatively rotatably connected to the primary mass and connectable with a clutch; and a damping unit for coupling the primary and secondary masses to each other in a rotationally elastic manner. The damping unit includes: a plurality of coil springs situated in series and disposed one after the other within the divided portions of the ring-shaped chamber; a pair of end guides slidably disposed within each divided portion of the ring-shaped chamber and supporting outer ends of the coil springs among the plurality of elastic members; and a friction guide disposed between neighboring coil springs and provided with an outer circumferential surface configured to be rubbed against an outer wall of the ring-shaped chamber. An oil groove is formed on the outer circumferential surface of the friction guide and at least a portion of the oil groove is formed to be slanted with respect to a circumferential direction of the ring-shaped chamber.

The oil groove may be slanted to form an acute angle with respect to the circumferential direction of the ring-shaped chamber.

The oil groove may be formed to be symmetrical with respect to the circumferential direction of the ring-shaped chamber.

The oil groove may be V-shaped.

The oil groove may include a first oil groove formed to be symmetrical with respect to the circumferential direction of the ring-shaped chamber and a second oil groove formed along the circumferential direction of the ring-shaped chamber.

In another embodiment, a torsional vibration damper includes: a primary mass defining a substantially ring-shaped chamber that is divided into at least two portions; a secondary mass relatively rotatably connected to the primary mass; and a plurality of damping units, disposed in the divided portion of the ring-shaped chamber, for coupling the primary and secondary masses to each other in a rotationally elastic manner. Each of the damping units includes: a plurality of coil springs situated in series and disposed one after the other within the divided portions of the ring-shaped chamber; and a friction guide disposed between neighboring coil springs and provided with an outer circumferential surface configured to be rubbed against an outer wall of the ring-shaped chamber. An oil groove is formed on the outer circumferential surface of the friction guide and at least a portion of the oil groove is formed to be slanted with respect to a circumferential direction of the ring-shaped chamber.

In a further embodiment, a torsional vibration damper includes: a primary mass adapted to be coupled to an engine crankshaft for rotation about a rotational axis of the engine crankshaft, the primary mass defining a substantially ring-shaped chamber that is divided into at least two portions; a secondary mass relatively rotatably connected to the primary mass and connectable with a clutch; and a damping unit for coupling the primary and secondary masses to each other in a rotationally elastic manner. The damping unit includes: a plurality of coil springs situated in series and disposed one after the other within the divided portions of the ring-shaped chamber; a pair of end guides slidably disposed within each divided portion of the ring-shaped chamber and supporting outer ends of the coil springs among the plurality of elastic members; and a friction guide disposed between neighboring coil springs and provided with an outer circumferential surface configured to be rubbed against an outer wall of the ring-shaped chamber. A coil spring receiving hole for receiving a coil spring is formed in the friction guide and an abrasion resistance layer is formed on at least a portion of an inner surface of the coil spring receiving hole.

The abrasion resistance layer may be made of a material that is more resistant to abrasion than the material of the friction guide.

In a still further embodiment, a torsional vibration damper includes: a primary mass defining a substantially ring-shaped chamber that is divided into at least two portions; a secondary mass relatively rotatably connected to the primary mass; and a plurality of damping units, disposed in the divided portion of the ring-shaped chamber, for coupling the primary and secondary masses to each other in a rotationally elastic manner. Each of the damping units includes: a plurality of coil springs situated in series and disposed one after the other within the divided portions of the ring-shaped chamber; and a friction guide disposed between neighboring coil springs and provided with an outer circumferential surface configured to be rubbed against an outer wall of the ring-shaped chamber. A coil spring receiving hole for receiving a coil spring is formed in the friction guide and an abrasion resistance layer is formed on at least a portion of an inner surface of the coil spring receiving hole.

In another embodiment, a torsional vibration damper includes: a primary mass adapted to be coupled to an engine crankshaft for rotation about a rotational axis of the engine crankshaft, the primary mass defining a substantially ring-shaped chamber that is divided into at least two portions; a secondary mass relatively rotatably connected to the primary mass and connectable with a clutch; and a damping unit for coupling the primary and secondary masses to each other in a rotationally elastic manner. The damping unit includes: a plurality of coil springs situated in series and disposed one after the other within the divided portions of the ring-shaped chamber; a pair of end guides slidably disposed within each divided portion of the ring-shaped chamber and supporting outer ends of the coil springs among the plurality of elastic members; and a friction guide disposed between neighboring coil springs and provided with an outer circumferential surface configured to be rubbed against an outer wall of the ring-shaped chamber. A coil spring receiving hole for receiving a coil spring is formed in the friction guide and a portion of a side wall forming the coil spring receiving hole is removed to reduce friction with the coil spring.

In yet another embodiment, a torsional vibration damper includes: a primary mass defining a substantially ring-shaped chamber that is divided into at least two portions; a secondary mass relatively rotatably connected to the primary mass; and a plurality of damping units, disposed in the divided portion of the ring-shaped chamber, for coupling the primary and secondary masses to each other in a rotationally elastic manner. Each of the damping units includes: a plurality of coil springs situated in series and disposed one after the other within the divided portions of the ring-shaped chamber; and a friction guide disposed between neighboring coil springs and provided with an outer circumferential surface configured to be rubbed against an outer wall of the ring-shaped chamber. A coil spring receiving hole for receiving a coil spring is formed in the friction guide and a portion of a side wall forming the coil spring receiving hole is removed to reduce friction with the coil spring.

In a further embodiment, a torsional vibration damper includes: a primary mass adapted to be coupled to an engine crankshaft for rotation about a rotational axis of the engine crankshaft, the primary mass defining a substantially ring-shaped chamber that is divided into at least two portions; a secondary mass relatively rotatably connected to the primary mass and connectable with a clutch; and a damping unit for coupling the primary and secondary masses to each other in a rotationally elastic manner. The damping unit includes: a plurality of coil springs situated in series and disposed one after the other within the divided portions of the ring-shaped chamber; a pair of end guides slidably disposed within each divided portion of the ring-shaped chamber and supporting outer ends of the coil springs among the plurality of elastic members; and a friction guide disposed between neighboring coil springs and provided with an outer circumferential surface configured to be rubbed against an outer wall of the ring-shaped chamber. At least one groove is formed on an inner circumferential surface of the friction guide.

The at least one groove comprises a first groove that may be formed at a position facing an end portion of an inner wall of the ring-shaped chamber along the circumferential direction of the ring-shaped chamber.

The at least one groove may further include a second groove that is formed at a position facing the inner wall of the ring-shaped chamber along the circumferential direction of the ring-shaped chamber.

In a still further embodiment, a torsional vibration damper includes: a primary mass defining a substantially ring-shaped chamber that is divided into at least two portions; a secondary mass relatively rotatably connected to the primary mass; and a plurality of damping units, disposed in the divided portion of the ring-shaped chamber, for coupling the primary and secondary masses to each other in a rotationally elastic manner. Each of the damping units includes: a plurality of coil springs situated in series and disposed one after the other within the divided portions of the ring-shaped chamber; and a friction guide disposed between neighboring coil springs and provided with an outer circumferential surface configured to be rubbed against an outer wall of the ring-shaped chamber. A groove is formed on an inner circumferential surface of the friction guide in at least one of a position facing an end portion of an inner wall of the ring-shaped chamber along the circumferential direction of the ring-shaped chamber and a position facing the inner wall of the ring-shaped chamber along the circumferential direction of the ring-shaped chamber.

In an alternative embodiment, a torsional vibration damper includes: a primary mass adapted to be coupled to an engine crankshaft for rotation about a rotational axis of the engine crankshaft, the primary mass defining a substantially ring-shaped chamber that is divided into at least two portions; a secondary mass relatively rotatably connected to the primary mass and connectable with a clutch; and a damping unit for coupling the primary and secondary masses to each other in a rotationally elastic manner. The damping unit includes: a plurality of coil springs situated in series and disposed one after the other within the divided portions of the ring-shaped chamber; a pair of end guides slidably disposed within each divided portion of the ring-shaped chamber and supporting outer ends of the coil springs among the plurality of elastic members; and a friction guide disposed between neighboring coil springs and provided with at least one frictional surface configured to be rubbed against an inner surface of the ring-shaped chamber, a coil spring receiving hole for receiving a coil spring being formed in the friction guide. At least one oil passage extending from an inner surface of the coil spring receiving hole to the frictional surface is formed in the friction guide.

The at least one frictional surface may include an outer frictional surface configured to be rubbed against an outer wall of the ring-shaped chamber and an inner frictional surface configured to be rubbed against an inner wall of the ring-shaped chamber, and the at least one oil passage may include at least one of a first oil passage extending from the inner surface of the coil spring receiving hole to the outer frictional surface and a second oil passage extending from the inner surface of the coil spring receiving hole to the inner frictional surface.

In another embodiment, a torsional vibration damper includes: a primary mass defining a substantially ring-shaped chamber that is divided into at least two portions; a secondary mass relatively rotatably connected to the primary mass; and a plurality of damping units, disposed in the divided portion of the ring-shaped chamber, for coupling the primary and secondary masses to each other in a rotationally elastic manner. Each of the damping units includes: a plurality of coil springs situated in series and disposed one after the other within the divided portions of the ring-shaped chamber; and a friction guide disposed between neighboring coil springs and provided with at least one frictional surface configured to be rubbed against an inner surface of the ring-shaped chamber, a coil spring receiving hole for receiving a coil spring being formed in the friction guide. At least one oil passage extending from an inner surface of the coil spring receiving hole to the inner surface of the ring-shaped chamber is formed in the friction guide.

In a further embodiment, a torsional vibration damper includes: a primary mass adapted to be coupled to an engine crankshaft for rotation about a rotational axis of the engine crankshaft, the primary mass defining a substantially ring-shaped chamber that is divided into at least two portions; a secondary mass relatively rotatably connected to the primary mass and connectable with a clutch; and a damping unit for coupling the primary and secondary masses to each other in a rotationally elastic manner. The damping unit includes: a plurality of coil springs situated in series and disposed one after the other within the divided portions of the ring-shaped chamber; a pair of end guides slidably disposed within each divided portion of the ring-shaped chamber and supporting outer ends of the coil springs among the plurality of elastic members; and a friction member disposed between neighboring coil springs and configured to be rubbed against an inner surface of the ring-shaped chamber. The friction member includes: an outer wedge-shaped friction guide at one end of which a first coil spring receiving hole for receiving one of the neighboring coil springs is formed, and at the other end of which a first slanted surface is formed; and an inner wedge-shaped friction guide at one end of which a second coil spring receiving hole for receiving the other of the neighboring coil springs is formed, and at the other end of which a second slanted surface to surface-contact the first slanted surface is formed. A first oil passage extending from an inner surface of the first coil spring receiving hole to the first slanted surface is formed in the outer wedge-shaped friction guide, and a second oil passage extending from an inner surface of the second coil spring receiving hole to the second slanted surface is formed in the inner wedge-shaped friction guide.

In another embodiment, a torsional vibration damper includes: a primary mass defining a substantially ring-shaped chamber that is divided into at least two portions; a secondary mass relatively rotatably connected to the primary mass; and a plurality of damping units, disposed in the divided portion of the ring-shaped chamber, for coupling the primary and secondary masses to each other in a rotationally elastic manner. Each of the damping units includes: a plurality of coil springs situated in series and disposed one after the other within the divided portions of the ring-shaped chamber; and a friction member disposed between neighboring coil springs and configured to be rubbed against an inner surface of the ring-shaped chamber. The friction member includes: an outer wedge-shaped friction guide at one end of which a first coil spring receiving hole for receiving one of the neighboring coil springs is formed, and at the other end of which a first slanted surface is formed; and an inner wedge-shaped friction guide at one end of which a second coil spring receiving hole for receiving the other of the neighboring coil springs is formed, and at the other end of which a second slanted surface to surface-contact the first slanted surface is formed. A first oil passage extending from an inner surface of the first coil spring receiving hole to the first slanted surface is formed in the outer wedge-shaped friction guide, and a second oil passage extending from an inner surface of the second coil spring receiving hole to the second slanted surface is formed in the inner wedge-shaped friction guide.

BRIEF DESCRIPTION OF THE DRAWINGS

The accompanying drawings illustrate exemplary embodiments of the present invention, and, together with the description, serve to explain the principles of the present invention, wherein.

DETAILED DESCRIPTION OF THE EMBODIMENTS

Embodiments of the present invention will hereinafter be described in detail with reference to the accompanying drawings.

Figure 1:
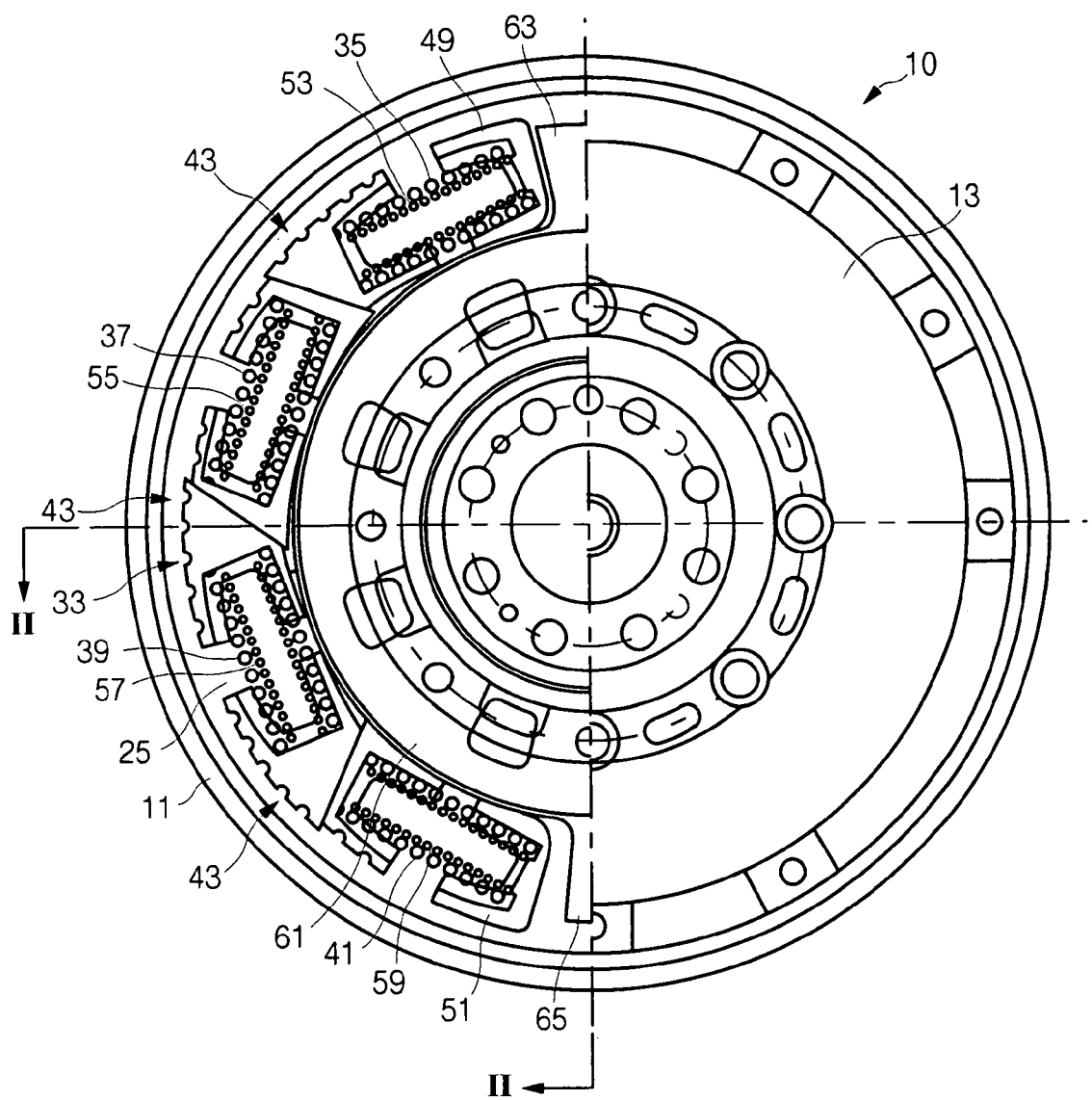
FIG. 1 is a partially broken-away plan view showing an inner structure of a torsional vibration damper according to an embodiment of the present invention.
Figure 2:
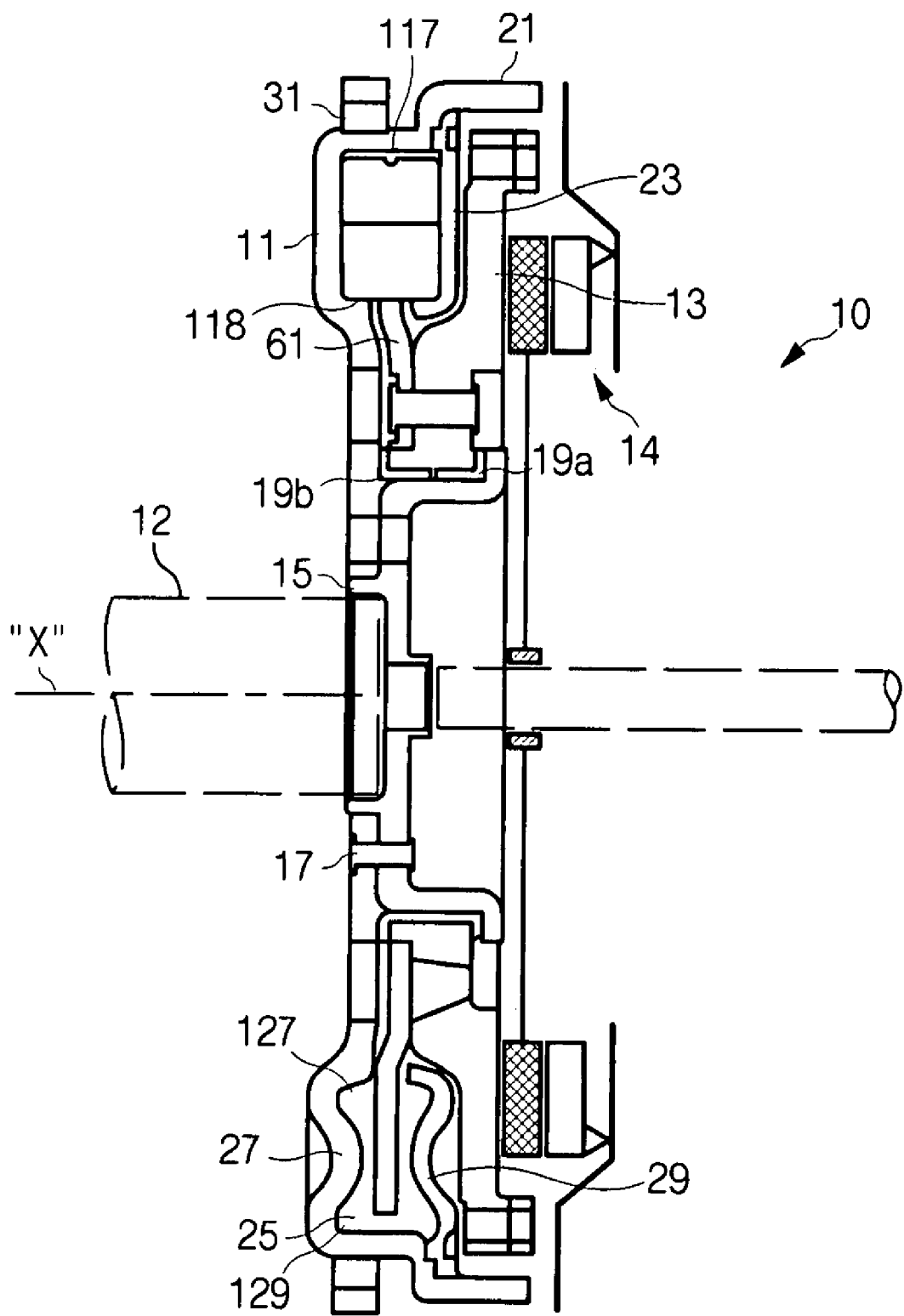
FIG. 2 is a sectional view approximately along line A-A in FIG. 1.

As shown in FIGS. 1 and 2, a torsional vibration damper 10 according to an embodiment of the present invention includes a primary mass 11, a secondary mass 13, and a damping unit 33.

The torsional vibration damper 10 according to an embodiment of the present invention may be disposed between an engine (not shown) and a transmission (not shown), and functions to damper torsional vibration that is generated during power transmission. The torsional vibration damper 10 can be used between any power transmission portions, in addition to between the engine and the transmission.

The primary mass 11 is adapted to be coupled to an engine crankshaft 12 for rotation about a rotational axis "X" of the engine crankshaft 12.

The secondary mass 13 is relatively rotatably connected to the primary mass 11 and is configured to be connectable with a clutch 14.

A hub 15 is coupled to a center portion of the primary mass 11 through a rivet (or a bolt) 17, and the secondary mass 13 is rotatably connected to the hub 15 through a pair of bushings 19a and 19b. Thus, the secondary mass 13 is rotatably connected to the primary mass 11.

The primary and secondary masses 11 and 13 may be connected to each other through two bushings 19a and 19b, and therefore, torsional stress acting on each of the bushings 19a and 19b is decreased so that distortion of the bushings 19a and 19b can be minimized.

As shown in FIGS. 1 and 2, the primary mass 11 can have a shape of a circular plate, although it will be appreciated by one of ordinary skill in the art that the masses can be of any appropriate shape.

The primary mass 11 defines a substantially ring-shaped chamber 25. A folded edge portion 21 is provided around the edge of the primary mass 11, and a cover 23 is coupled to the edge portion 21, thereby defining the ring-shaped chamber 25. One of ordinary skill in the art can appreciate that the ring-shaped chamber can be defined in any other way.

The ring-shaped chamber 25 may be divided into at least two portions. For example, the ring-shaped chamber can be divided into at least two portions by a first protrusion 27 that is formed on the primary mass 11 and/or a second protrusion 29 formed on the cover 23. Although the ring-shaped chamber 25 is divided into two portions in FIG. 2, it will be appreciated by one of ordinary skill in the art that the ring-shaped chamber 25 can be divided into more than two portions. The ring-shaped chamber 25 may be at least partially filled with lubrication oil.

The first and second protrusions 27 and 29 may be formed near a radial center portion of the ring-shaped chamber 25, so that lubrication oil passages 127 and 129 are formed on both sides of the first and second protrusions 27 and 29. Thus, the divided portions of the ring-shaped chamber 25 can be connected via the lubrication oil passages 127 and 129. The lubrication oil can move between the divided portions of the ring-shaped chamber 25 through the lubrication oil passages 127 and 129, so that lubrication oil can be prevented from gathering in one of the divided portions.

A ring gear 31 is formed on an outer circumference of the primary mass 11. The ring gear 31 is for connection with a starter motor.

A damping unit 33 is disposed in each divided portion of the ring-shaped chamber 25. The damping unit 33 is supported by the first and/or second protrusions 27 and 29. The damping unit 33 couples the primary and secondary masses 11 and 13 to each other in a rotationally elastic manner.

The damping unit 33 is disposed in the divided portion of the ring-shaped chamber 25 such that it is supported by the first protrusion 27 and/or the second protrusion 29.

Hereinafter, the divided portions of the ring-shaped chamber 25 are simply referred to as the ring-shaped chamber.

Referring again to FIG. 1, the damping unit 33 includes a plurality of coil springs 35, 37, 39, and 41, and a friction member 43 that is disposed between the coil springs 35, 37, 39, and 41. The coil springs 35, 37, 39, and 41 are situated in series and disposed one after the other within the ring-shaped chamber 25. In an alternative embodiment, other suitable elastic members that can be compressed and provide an elastic force can be used in place of the coil springs, as will be appreciated by one of ordinary skill in the art. The damping unit 33 may further include a pair of end guides 49 and 51 that are slidably disposed within the ring-shaped chamber 25 and respectively support outer ends of the end coil springs 35 and 41 among the coil springs 35, 37, 39, and 41.

The damping member 43 has a direct effect on a damping characteristic of the damping unit 33, so it can be referred to as a hysteresis member.

The end guides 49 and 51 are supported by the first and second protrusions 27 and 29.

The plurality of coil springs 35, 37, 39, and 41 are situated in series between the end guides 49 and 51 within the ring-shaped chamber 25.

As shown in FIG. 1, a plurality of auxiliary coil springs 53, 55, 57, and 59 may be respectively disposed within the coil springs 35, 37, 39, and 41. Due to the auxiliary coil springs 53, 55, 57, and 59, sequential damping can be achieved.

The end guides 49 and 51 are slidably disposed within the ring-shaped chamber 25, and support the outer coil springs 35 and 41 among the plurality of coil springs 35, 37, 39, and 41.

The friction member 43 is slidably disposed between neighboring coil springs, e.g., 37 and 39, and is configured to be rubbed against at least one of an inner wall 118 and an outer wall 117 of the ring-shaped chamber 25 in response to compressions of the coil springs such that the friction force is generated in proportion to a relative rotation between the primary and secondary masses 11 and 13, and to a rotational speed thereof.

As shown in FIGS. 1 and 2, a drive plate 61 is fixedly coupled to the secondary mass 13, thereby rotating together with the secondary mass 13.

The drive plate 61 is configured to compress the damping unit 33 in response to a relative rotation between the primary and secondary masses 11 and 13.

Figure 3:
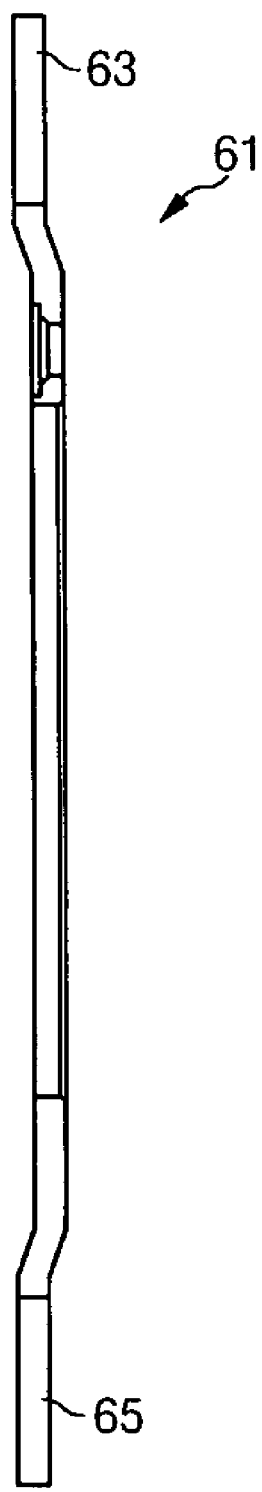
FIGS. 3 and 4 are side views of a drive plate of the torsional vibration damper according to an embodiment of the present invention.
Figure 4:
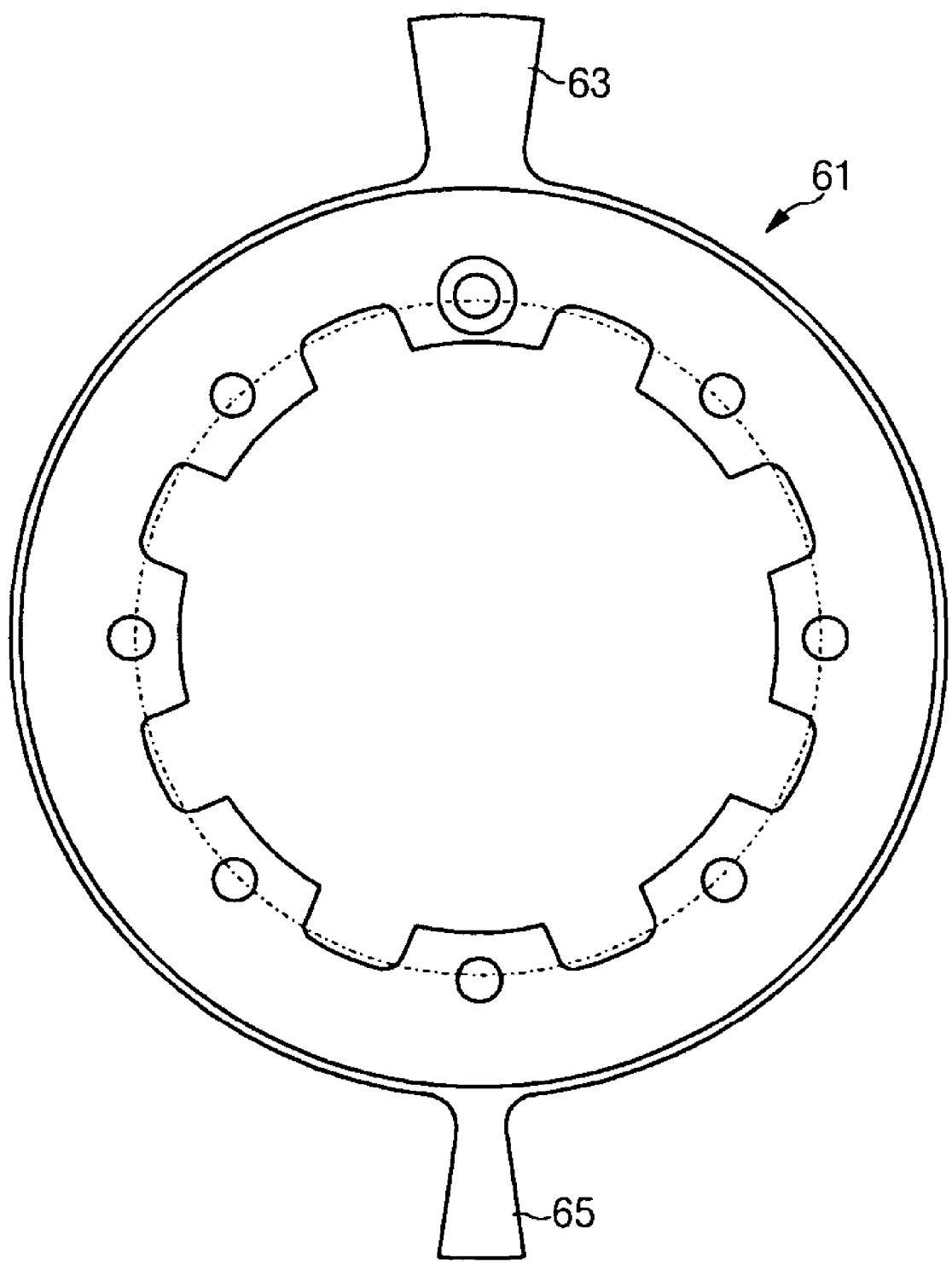

As shown in FIGS. 3 and 4, the drive plate 61 may have a ring shape, and first and second compression fins 63 and 65 may be oppositely provided on an outer circumference of the drive plate 61.

At least a portion of the compression fins 63 and 65 are positioned within the ring-shaped chamber 25, and have shapes and sizes that facilitate movement in the ring-shaped chamber 25. In addition, the compression fins 63 and 65 are configured to pass between the first and second protrusions 27 and 29 that divide the ring-shaped chamber 25.

When a power transmission does not occur in the torsional vibration damper 10, the compression fins 63 and 65 are positioned between the first and second protrusions 27 and 29. Meanwhile, while a power transmission occurs in the torsional vibration damper 10, the compression fins 63 and 65 move along the ring-shaped chamber 25 to compress the end guides 49 and 51.

For example, when the drive plate 61 rotates counter-clockwise in FIG. 1 with respect to the primary mass 11, the first compression fin 63 compresses the end guide 49, and the second compression fin 65 compresses an end guide that is disposed within the other divided portion of the ring-shaped chamber 25. At this time, the other end guide 51 is supported by the first and second protrusions 27 and 29.

Therefore, the damping unit 33 is compressed by the primary mass 11 and the drive plate 61 in response to the relative rotation between the primary and secondary masses 11 and 13. Consequently, in response to the relative rotation between the primary and secondary masses 11 and 13, the plurality of coil springs 35, 37, 39, and 41 are also compressed. The friction member 43 slides in the ring-shaped chamber 25 as a result of the compression of the coil springs 35, 37, 39, and 41, and the friction member 43 is rubbed against the inner or outer walls 118 and 117 of the ring-shaped chamber 25 to generate a friction force.

Consequently, a damping is achieved by the compression of the coil springs 35, 37, 39, and 41 and the friction force generated by the movement of the friction member 43.

As shown in FIG. 4, the first and second compression fins 63 and 65 have different widths, so that the damping units are sequentially compressed. That is, because the first compression fin 63, having a greater width, initially compresses one of the damping units, and the second compression fin 65, having a lesser width, then compresses the other of the damping units, a two-step damping characteristic can be realized. However, it will be appreciated by one of ordinary skill in the art that a multiple step damping can be realized.

The damping units that are respectively disposed within the divided portions of the ring-shaped chamber 25 are sequentially compressed by the first and second compression fins 63 and 65, and this causes a multiple step damping, so that a torsional vibration can be effectively dampened.

Hereinafter, referring to FIGS. 5 to 8, the friction member 43 according to an embodiment of the present invention will be explained in detail.

Figure 5:
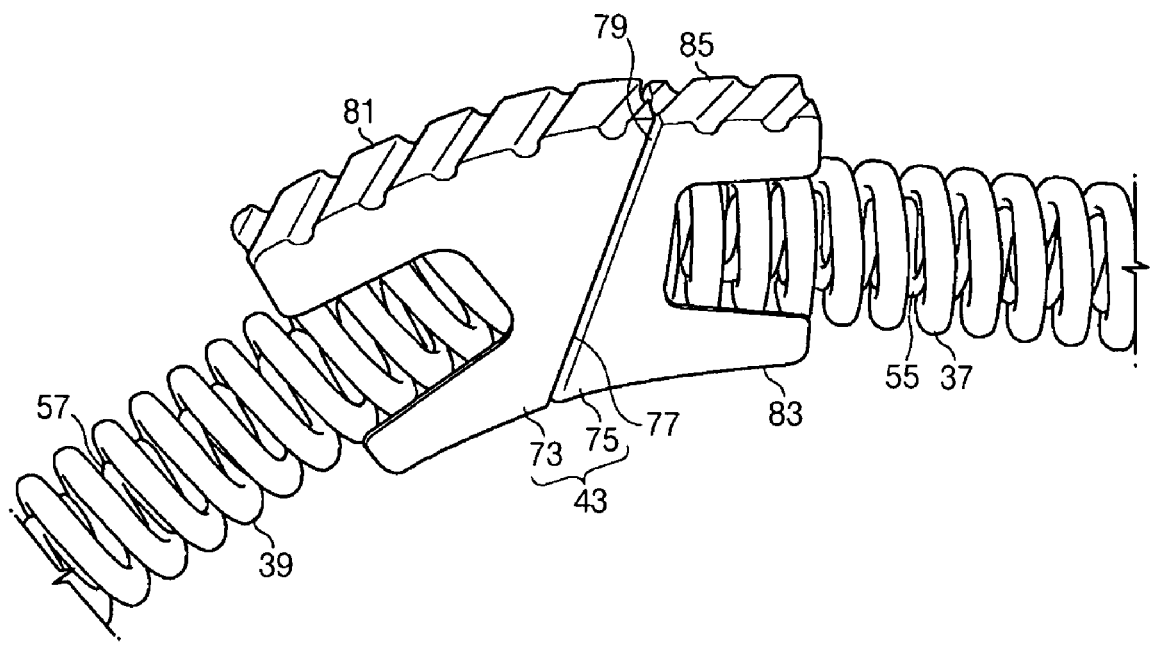
FIG. 5 is a perspective view of a friction member of a torsional vibration damper according to an embodiment of the present invention.

FIG. 5 is a perspective view of the friction member 43 that is disposed between the neighboring coil springs 37 and 39. As shown in FIG. 5, the friction member includes an outer wedge-shaped friction guide 73 and an inner wedge-shaped friction guide 75. The outer and inner wedge-shaped friction guides 73 and 75 are disposed between the neighboring coil springs 37 and 39.

A first slanted surface 77 is formed on the outer wedge-shaped friction guide 73, and a second slanted surface 79 is formed on the inner wedge-shaped friction guide 75. The outer and inner wedge-shaped friction guides 73 and 75 are disposed such that the first slanted surface 77 and the second slanted surface 79 contact each other. Thus, if the coil springs 37 and 39 are compressed, the outer wedge-shaped friction guide 73 moves radially outward in the ring-shaped chamber 25, and the inner wedge-shaped friction guide 75 moves radially inward in the ring-shaped chamber 25. Accordingly, an outer circumferential surface 81 of the outer wedge-shaped friction guide 73 is rubbed against an outer wall 117 of the ring-shaped chamber 25, and an inner circumferential surface 83 of the inner wedge-shaped friction guide 75 is rubbed against an inner wall 118 of the ring-shaped chamber 25.

An oil groove 87 is formed on the outer circumferential surface 81 of the outer wedge-shaped friction guide 73 and an outer circumferential surface 85 of the inner wedge-shaped friction guide 75.

Figure 6:
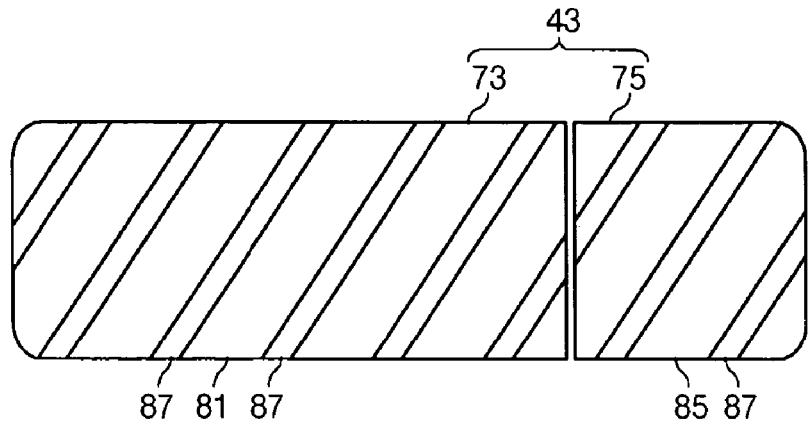
FIG. 6 is a top view of an outer circumferential surface of a friction member of FIG. 5.
Figure 7:
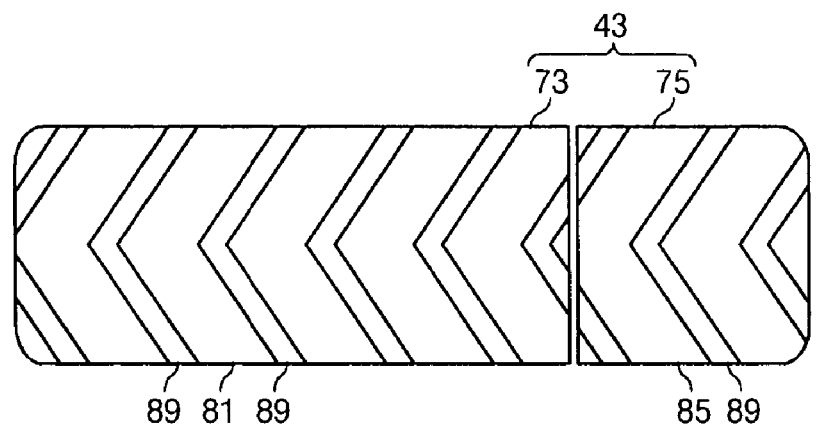
FIGS. 7 and 8 show other examples of oil grooves formed on an outer circumferential surface of the friction member of FIG. 5.
Figure 8:
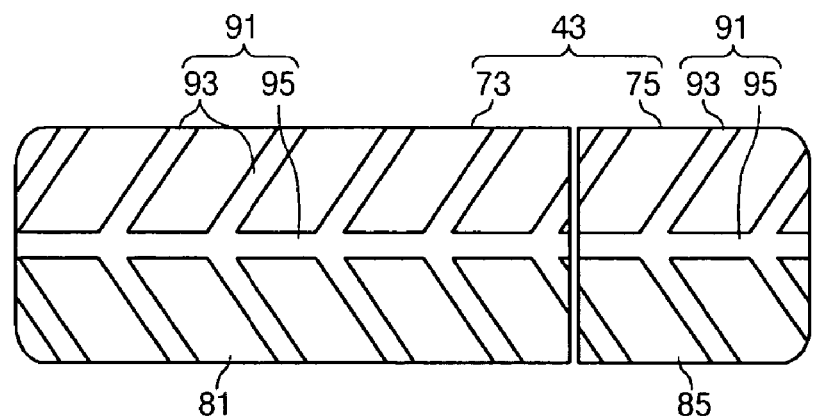

FIG. 6 shows the outer circumferential surfaces of the outer and inner wedge-shaped friction guides of FIG. 5. FIGS. 7 and 8 show other examples of the oil grooves formed on the outer circumferential surfaces of the outer and inner wedge-shaped friction guides. Referring to FIGS. 6 to 8, at least a portion of the oil groove may be slanted with respect to a circumferential direction of the ring-shaped chamber 25. For example, at least a portion of the oil groove is formed not to be parallel with and not to be perpendicular to the circumferential direction of the ring-shaped chamber 25.

Because at least a portion of the oil groove is formed to be slanted with respect to the circumferential direction of the ring-shaped chamber 25, the lubrication oil can be effectively dispersed in the ring-shaped chamber 25. Accordingly, uniform lubrication can be achieved, and thus the damping characteristics can be improved.

As shown in FIGS. 5 and 6, the oil groove 87 may be slanted to form an acute angle with the circumferential direction of the ring-shaped chamber 25.

Lubrication oil moves in an opposite direction to a moving direction in response to a movement of the outer wedge-shaped friction guide 73 and the inner wedge-shaped friction guide 75 within the ring-shaped chamber 25. If the outer and inner wedge-shaped friction guides 73 and 75 move in a right direction in FIG. 6, lubrication oil moves along the oil groove 87 toward a lower portion (in FIG. 6) of the outer circumferential surfaces 81 and 85. On the other hand, if the outer and inner wedge-shaped friction guides 73 and 75 move in a left direction in FIG. 6, lubrication oil moves along the oil groove 87 toward an upper portion (in FIG. 6) of the outer circumferential surfaces 81 and 85. Accordingly, in response to the movements of the outer and inner wedge-shaped friction guides 73 and 75, lubrication oil can be uniformly dispersed in the ring-shaped chamber 25. Therefore, stable damping can be achieved, and an abrasion resistance of the friction member 43 can be improved.

The oil groove may also be formed to be symmetrical with respect to the circumferential direction of the ring-shaped chamber 25.

For example, as shown in FIG. 7, an oil groove 89 may be formed to be V-shaped. If the outer and inner wedge-shaped friction guides 73 and 75 move in a right direction in FIG. 7, lubrication oil gathers at a center portion of the outer circumferential surfaces 81 and 85. On the other hand, if the outer and inner wedge-shaped friction guides 73 and 75 move in a left direction in FIG. 7, lubrication oil moves from a center portion of the outer circumferential surfaces 81 and 85 toward outer portions thereof. Accordingly, in response to the movements of the outer and inner wedge-shaped friction guides 73 and 75, lubrication oil can be uniformly dispersed in the ring-shaped chamber 25.

As shown in FIG. 8, an oil groove 91 may include a first oil groove 93 that is formed to be symmetrical with respect to the circumferential direction of the ring-shaped chamber 25 and a second oil groove 95 that is formed along the circumferential direction of the ring-shaped chamber. The first oil groove 93 may be formed to be V-shaped.

Because of the V-shaped first oil groove 93 and the second oil groove 95 along the circumferential direction of the ring-shaped chamber 25, lubrication oil can be effectively dispersed in the ring-shaped chamber 25.

Although, in this embodiment, the friction member 43 includes two friction guides, in an alternative embodiment, the friction member may be realized by one friction guide that generates friction force by a centrifugal force, as one of ordinary skill in the art will appreciate.

Hereinafter, a friction member according to other embodiments of the present invention will be explained. Since other elements except the friction member may be equal to those of the above-stated embodiment, explanations for the other elements will be omitted.

Figure 9:
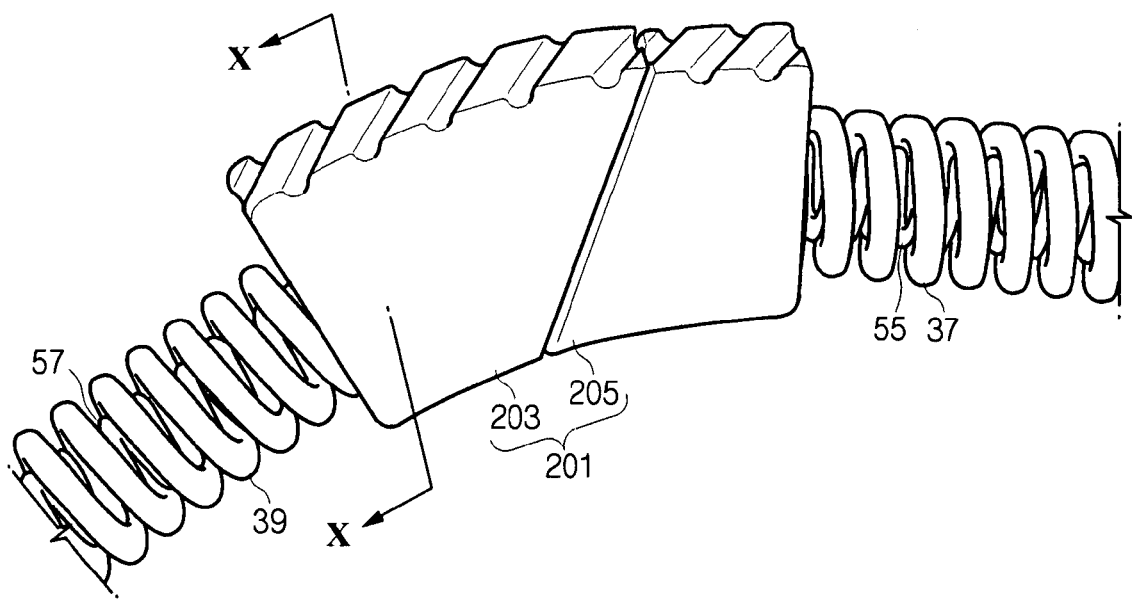
FIG. 9 is a perspective view of a friction member of a torsional vibration damper according to another embodiment of the present invention.
Figure 10:
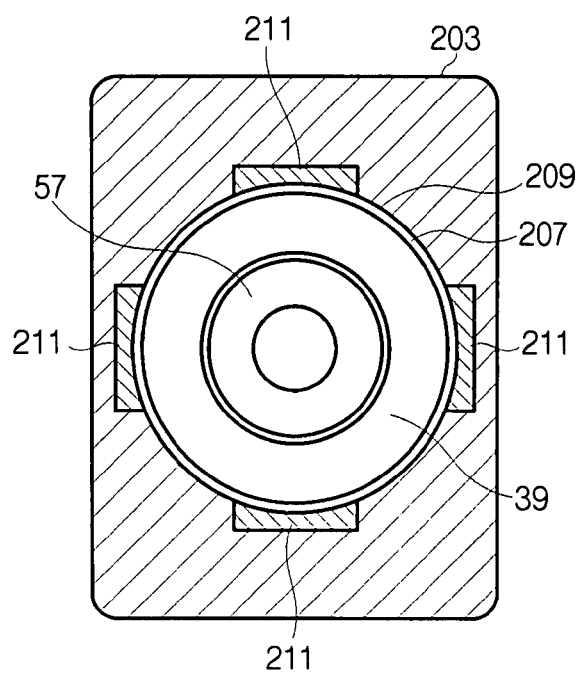
FIG. 10 is a sectional view along a line B-B in FIG. 9.

Referring to FIGS. 9 and 10, the friction member according to another embodiment of the present invention will be explained.

As shown in FIG. 9, a friction member 201 may include an outer wedge-shaped friction guide 203 and an inner wedge-shaped friction guide 205.

Similar to the above embodiment, the outer and inner wedge-shaped friction guides 203 and 205 are provided respectively with a slanted surface, and they are disposed such that the slanted surfaces contact each other. The outer and inner wedge-shaped friction guides 203 and 205 are elastically supported by the neighboring coil springs 37 and 39.

FIG. 10 is a sectional view along a line B-B of FIG. 9. As shown in FIG. 10, a coil spring receiving hole 207 is formed in the outer wedge-shaped friction guide 203.

An abrasion resistance layer 211 is formed on at least a portion of an inner surface 209 of the coil spring receiving hole 207. The abrasion resistance layer 211 is made of a material that is more resistant to abrasion than the material of the outer wedge-shaped friction guide 203. For example, the abrasion resistance layer 211 may be made of an arbitrary material having a high abrasion resistance such as metal and plastic materials.

In this embodiment, as shown in FIG. 10, four abrasion resistance layers 211 are formed in upper, lower, left-side, and right-side portions of the inner surface 209 of the coil spring receiving hole 207, although one of ordinary skill in the art will appreciate that a number of abrasion resistance layers can be varied and a position thereof can also be changed.

Because the abrasion resistance layer 211 is provided on the inner surface 209 of the coil spring receiving hole 207, damage to the outer wedge-shaped friction guide 203 by rubbing against the coil spring 39 can be minimized.

Similarly, a coil spring receiving hole is also formed in the inner wedge-shaped friction guide 205 and an abrasion resistance layer is also formed on an inner surface of the coil spring receiving hole. Thus, damage of the inner wedge-shaped friction guide can also be minimized.

Hereinafter, referring to FIGS. 11 and 12, a friction member according to a further another embodiment of the present invention will be explained.

Figure 11:
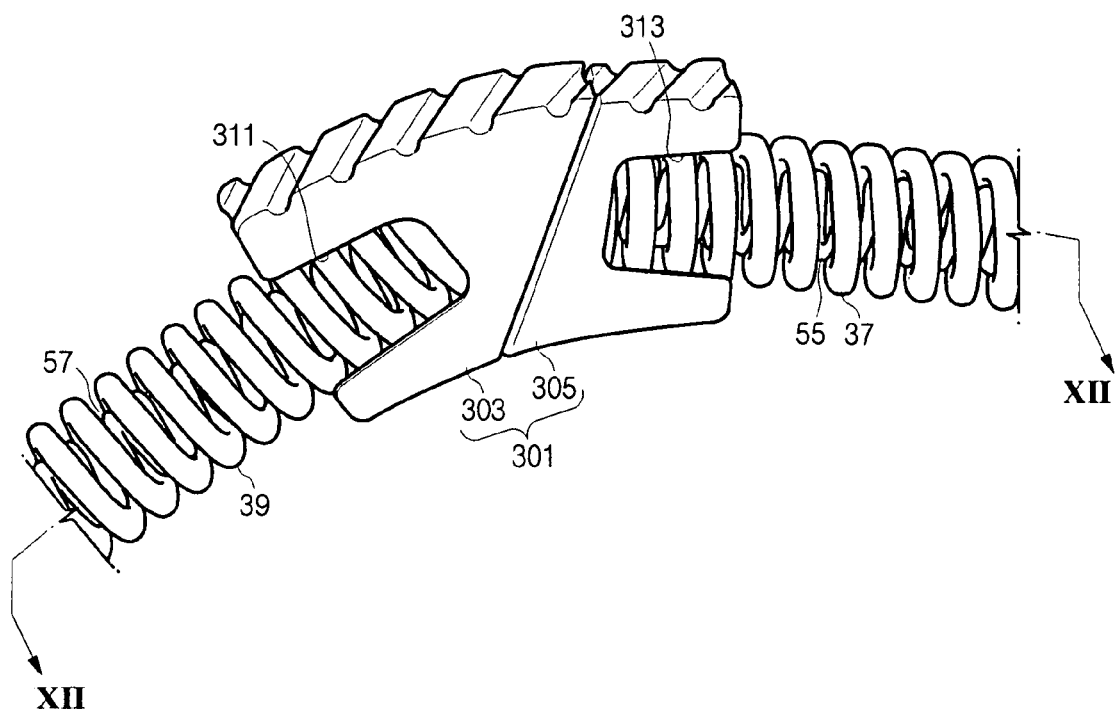
FIG. 11 is a perspective view of a friction member of a torsional vibration damper according to still another embodiment of the present invention.

As shown in FIG. 11, a friction member 301 may include an outer wedge-shaped friction guide 303 and the inner wedge-shaped friction guide 305.

The outer and inner wedge-shaped friction guides 303 and 305 are provided respectively with a slanted surface, and they are disposed such that the slanted surfaces contact each other.

The outer and inner wedge-shaped friction guides 303 and 305 are elastically supported by the neighboring coil springs 37 and 39.

Figure 12:
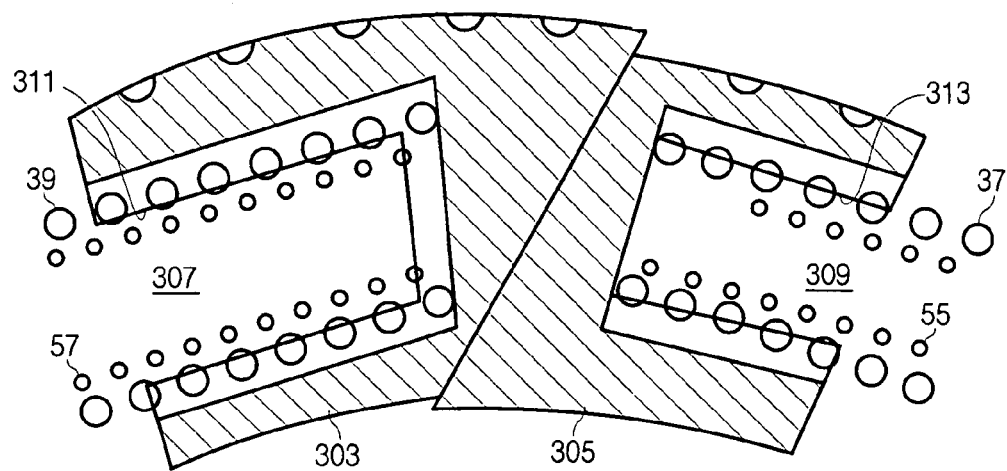
FIG. 12 is a sectional view along a line C-C in FIG. 11.

As shown in FIGS. 11 and 12, coil spring receiving holes 307 and 309 are formed respectively in the outer wedge-shaped friction guide 303 and the inner wedge-shaped friction guide 305.

In this embodiment, a portion of a side wall forming the coil spring receiving holes 307 and 309 is removed. That is, windows 311 and 313 are formed respectively in the side walls forming the coil spring receiving holes 307 and 309, so that a portion of the side walls forming the coil spring receiving holes 307 and 309 is removed.

Because a portion of the side wall forming the coil spring receiving holes is removed, rubbing between the side wall of the friction guide and the coil spring is decreased. Thus, damage to the friction member caused by rubbing against the coil spring can be minimized.

Hereinafter, referring to FIGS. 13 to 15, a friction member according to yet another embodiment of the present invention will be explained.

Figure 13:
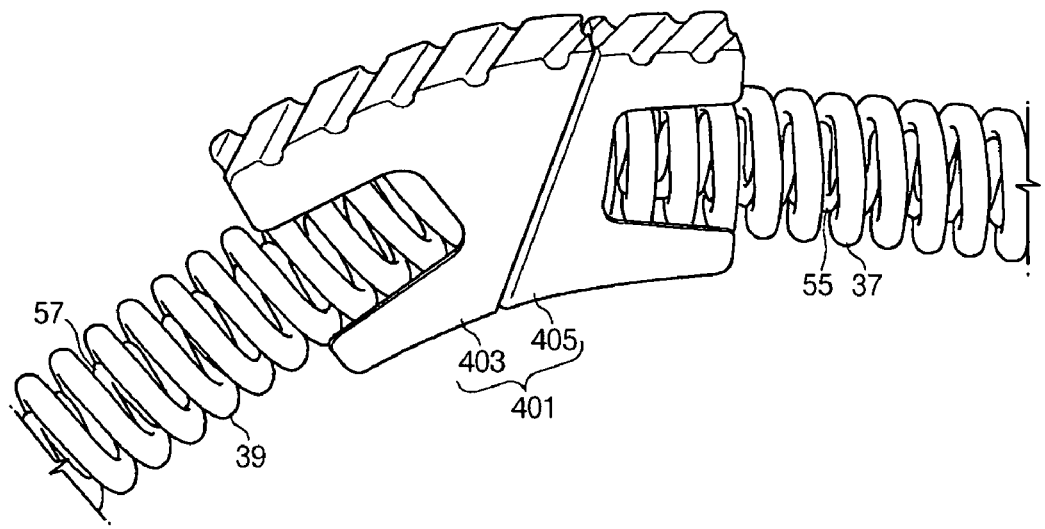
FIG. 13 is a perspective view of a friction member of a torsional vibration damper according to a further embodiment of the present invention.

As shown in FIG. 13, a friction member 401 includes an outer wedge-shaped friction guide 403 and an inner wedge-shaped friction guide 405. The outer and inner wedge-shaped friction guides 403 and 405 are provided respectively with a slanted surface, and they are disposed such that the slanted surfaces contact each other. The outer and inner wedge-shaped friction guides 403 and 405 are elastically supported by the neighboring coil springs 37 and 39.

Figure 14:
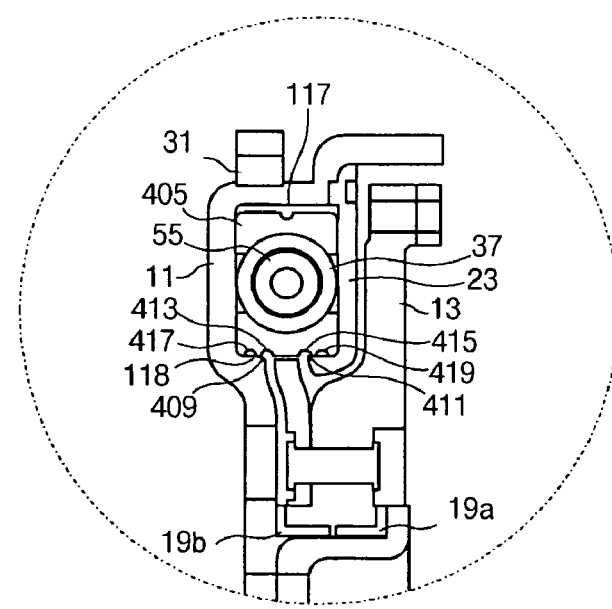
FIG. 14 is a partial sectional view of a torsional vibration damper having a friction member of FIG. 13.
Figure 15:
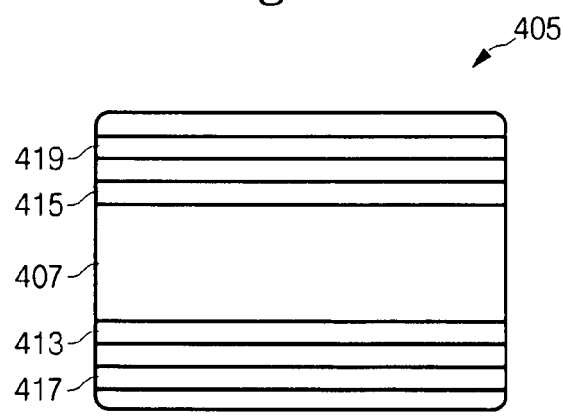
FIG. 15 is a plan view of an inner circumferential surface of the friction member of FIG. 13.

FIG. 14 is a partial sectional view of the torsional vibration damper having the friction member 401 according to this embodiment of the present invention, and FIG. 15 is a top view of an inner circumferential surface 407 of the inner wedge-shaped friction guide 405. As shown in FIGS. 14 and 15, at least one groove is formed on the inner circumferential surface 407 of the inner wedge-shaped friction guide 405.

First grooves 413 and 415 may be formed on the inner circumferential surface 407 of the inner wedge-shaped friction guide 405 at positions facing end portions 409 and 411 of the ring-shaped chamber 25. The first grooves 413 and 415 may be formed along a circumferential direction of the ring-shaped chamber 25.

Because the first grooves 413 and 415 are formed on the inner circumferential surface 407 of the inner wedge-shaped friction guide 405, they can prevent the inner circumferential surface 407 of the inner wedge-shaped friction guide 405 from contacting the end portions 409 and 411 of the inner wall 118 of the ring-shaped chamber 25. Therefore, damage to the inner wedge-shaped friction guide 405 can be minimized when it rubs against the inner wall 118 of the ring-shaped chamber 25.

Furthermore, second grooves 417 and 419 may be formed on the inner circumferential surface 407 of the inner wedge-shaped friction guide 405 at a position facing the inner wall 118 of the ring-shaped chamber 25. The second grooves 417 and 419 may be formed along the circumferential direction of the ring-shaped chamber 25. By forming second grooves 417 and 419 on the inner circumferential surface 407 of the inner wedge-shaped friction guide 405, lubrication oil can be uniformly dispersed between the inner circumferential surface 407 of the inner wedge-shaped friction guide 405 and the inner wall 118 of the ring-shaped chamber 25.

Hereinafter, referring to FIGS. 16 and 17, a friction member according to another embodiment of the present invention will be explained.

Figure 16:
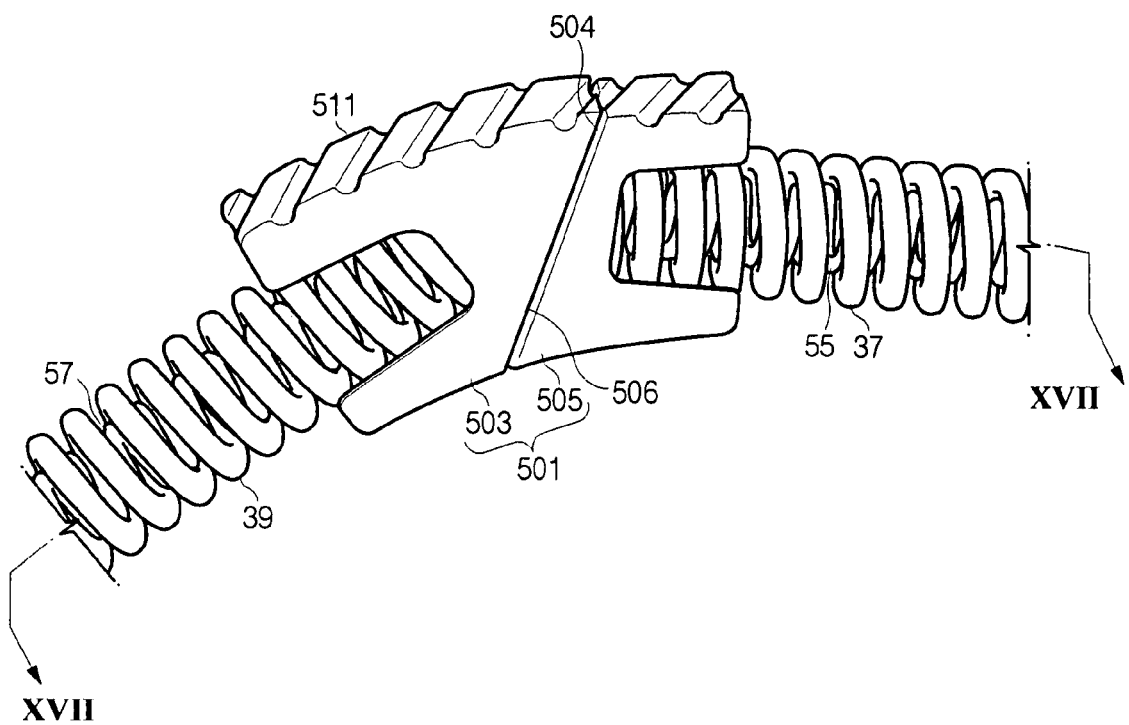
FIG. 16 is a perspective view of a friction member of a torsional vibration damper according to a still further embodiment of the present invention.

As shown in FIG. 16, a friction member 501 includes an outer wedge-shaped friction guide 503 and an inner wedge-shaped friction guide 505. The outer and inner wedge-shaped friction guides 503 and 505 are provided respectively with slanted surfaces 506 and 504, and they are disposed such that the slanted surfaces contact each other. The outer and inner wedge-shaped friction guides 503 and 505 are elastically supported by the neighboring coil springs 37 and 39.

Figure 17:
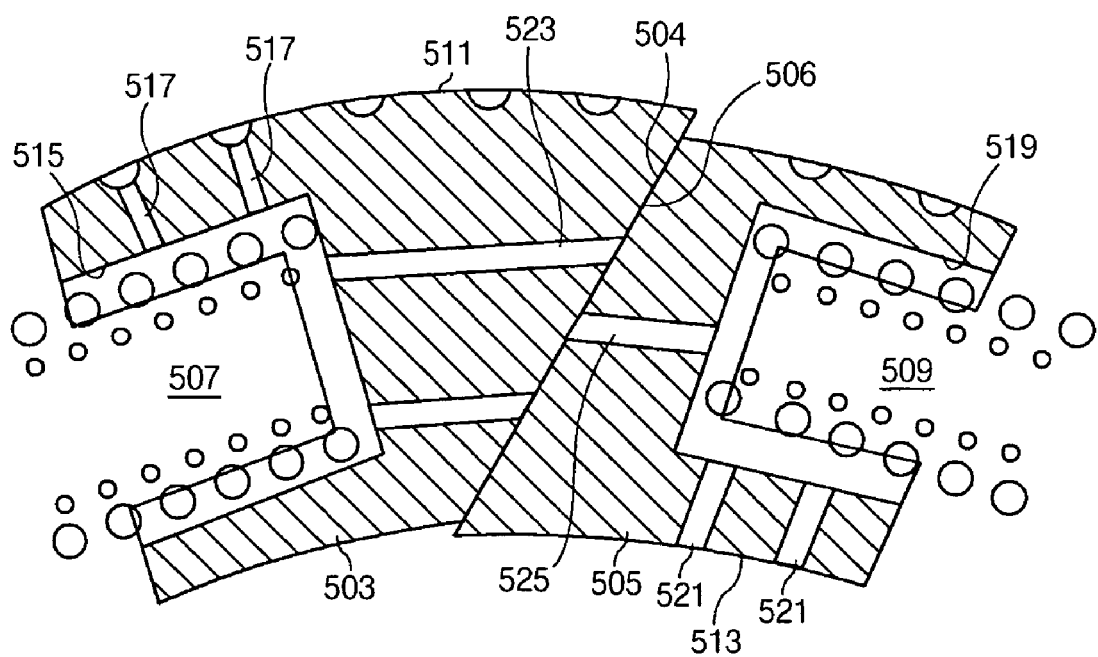
FIG. 17 is a sectional view along a line D-D of FIG. 16.

As shown in FIG. 17, the coil spring receiving holes 507 and 509 are formed respectively on one side of the outer and inner wedge-shaped friction guides 503 and 505. The outer wedge-shaped friction guide 503 is provided with a first frictional surface 511 that can be rubbed against the outer wall 117, i.e., an outer surface, of the ring-shaped chamber 25. The inner wedge-shaped friction guide 505 is provided with a second frictional surface 513 that can rub against the inner wall 118, i.e., an inner surface, of the ring-shaped chamber 25.

That is, the first frictional surface 511 corresponds to an outer circumferential surface of the outer wedge-shaped friction guide 503, and the second frictional surface 513 corresponds to an inner circumferential surface of the inner wedge-shaped friction guide 505.

At least one oil passage 517 extending from an inner surface 515 of the coil spring receiving hole 507 to the first frictional surface 511 is formed in the outer wedge-shaped friction guide 503, and at least one oil passage 521 extending from an inner surface 519 of the coil spring receiving hole 509 to the second frictional surface 513 is formed in the inner wedge-shaped friction guide 505.

In addition, at least one oil passage 523 extending from the inner surface 515 of the coil spring receiving hole 507 to the slanted surface 504 may be formed in the outer wedge-shaped friction guide 503, and at least one oil passage 525 extending from the inner surface 519 of the coil spring receiving hole 509 to the slanted surface 506 may be formed in the inner wedge-shaped friction guide 505.

Because of the oil passages connecting the inner surface of the coil spring receiving hole with the frictional surface and the slanted surface, lubrication oil can be effectively supplied to the frictional surface and the slanted surface where friction occurs. Thus, effective lubrication can be achieved.

While the present invention has been described in connection with the most practical exemplary embodiments, it is to be understood that the invention is not limited to the disclosed embodiments, but, on the contrary, is intended to cover various modifications and equivalent arrangements included within the spirit and scope of the appended claims.

According to an embodiment of the present invention, by forming an oil groove on an outer circumferential surface of a friction member, effective lubrication can be achieved.

Furthermore, by forming an abrasion resistance layer at an inner surface of a coil spring receiving hole of a friction member, it can minimize damage to the friction member when it rubs against a coil spring.

In addition, according to another embodiment of the present invention, because a portion of a side wall forming a coil spring receiving hole of a friction member is removed, it can minimize damage to the friction member when it rubs against a coil spring.

Still furthermore, by forming an oil groove on an inner circumferential surface of a friction member, effective lubrication between the friction member and an inner wall of a ring-shaped chamber can be achieved.

According to further embodiment of the present invention, because of oil passages connecting an inner surface of a coil spring receiving hole of a friction member with a frictional surface and a slanted surface of the friction member, effective lubrication of the frictional surface and the slanted surface can be achieved.

What is claimed is:

1. A torsional vibration damper, comprising:
   a primary mass adapted to be coupled to an engine crankshaft for rotation about a rotational axis of the engine crankshaft, the primary mass defining a substantially ring-shaped chamber that is divided into at least two portions;
   a secondary mass relatively rotatably connected to the primary mass and connectable with a clutch; and
   a damping unit for coupling the primary and secondary masses to each other in a rotationally elastic manner,
   wherein the damping unit comprises
   a plurality of elastic members situated in series and disposed one after the other within the divided portions of the ring-shaped chamber,
   a pair of end guides slidably disposed within each divided portion of the ring-shaped chamber and supporting outer ends of end ones of the elastic members, and
   a friction guide disposed between neighboring elastic members and comprising an inner wedge and an outer wedge, each wedge being provided with an outer circumferential surface, the wedges being configured for relative radial movement, during which the outer circumferential surface of the outer wedge is rubbed against an outer wall of the ring-shaped chamber,
   wherein an oil groove is formed on the outer circumferential surface of at least one of the wedges, and at least a portion of the oil groove is formed to be slanted with respect to a circumferential direction of the ring-shaped chamber.

2. The torsional vibration damper of claim 1, wherein the oil groove is slanted to form an acute angle with respect to the circumferential direction of the ring-shaped chamber.

3. The torsional vibration damper of claim 1, wherein the oil groove is formed to be symmetrical with respect to the circumferential direction of the ring-shaped chamber.

4. The torsional vibration damper of claim 3, wherein the oil groove is V-shaped.

5. The torsional vibration damper of claim 1, wherein the oil groove comprises: a first oil groove formed to be symmetrical with respect to the circumferential direction of the ring-shaped chamber; and a second oil groove formed along the circumferential direction of the ring-shaped chamber.

6. The torsional vibration damper of claim 5, wherein the first oil groove is V-shaped.

7. A torsional vibration damper, comprising:
   a primary mass defining a substantially ring-shaped chamber that is divided into at least two portions;
   a secondary mass relatively rotatably connected to the primary mass; and
   a plurality of damping units, disposed in the divided portion of the ring-shaped chamber, for coupling the primary and secondary masses to each other in a rotationally elastic manner,
   wherein each of the damping units comprise
   a plurality of elastic members situated in series and disposed one after the other within the divided portions of the ring-shaped chamber, and
   a friction guide disposed between neighboring elastic members and comprising an inner wedge and an outer wedge, each wedge being provided with an outer circumferential surface, the wedges being configured for relative radial movement, during which the outer circumferential surface of the outer wedge is rubbed against an outer wall of the ring-shaped chamber,
   wherein an oil groove is formed on the outer circumferential surface of at least one of the wedges, and at least a portion of the oil groove is formed to be slanted with respect to a circumferential direction of the ring-shaped chamber.

* * * * *